United States Patent [19]

Nomura et al.

[11] Patent Number: 5,485,315
[45] Date of Patent: Jan. 16, 1996

[54] BACKLASH REMOVING MECHANISM FOR ZOOM LENS ASSEMBLY

[75] Inventors: Hiroshi Nomura; Norio Sato; Nobuaki Aoki, all of Tokyo, Japan

[73] Assignee: Asahi Kogaku Kogyo Kabushiki Kaisha, Tokyo, Japan

[21] Appl. No.: 358,578

[22] Filed: Dec. 13, 1994

Related U.S. Application Data

[63] Continuation of Ser. No. 46,721, Apr. 16, 1993, abandoned.

[30] Foreign Application Priority Data

Apr. 17, 1992 [JP] Japan ................... 4-24854 U

[51] Int. Cl.$^6$ ..................... G02B 7/10
[52] U.S. Cl. ............ 359/701; 359/699; 359/700
[58] Field of Search ................. 359/694–707, 359/829, 830, 822, 823, 825, 826; 354/195.12, 286

[56] References Cited

U.S. PATENT DOCUMENTS

| | | | |
|---|---|---|---|
| 3,506,338 | 4/1970 | Holderbaum | 359/700 |
| 4,012,124 | 3/1977 | Toda et al. | 359/700 |
| 4,255,020 | 3/1981 | Yukio | 359/705 |
| 4,353,634 | 10/1982 | Himmelsbach | 359/694 |
| 4,555,165 | 11/1985 | Negoro | 359/696 |
| 4,720,167 | 1/1988 | Okura | 359/819 |
| 4,763,999 | 8/1988 | Lawther | 359/699 |
| 4,764,784 | 8/1988 | Torikoshi et al. | 359/705 |
| 4,950,061 | 8/1990 | Tsurukawa et al. | 359/696 |
| 4,951,083 | 8/1990 | Okura et al. | 355/484 |
| 4,974,949 | 12/1990 | Tanaka | 359/704 |
| 5,037,187 | 8/1991 | Oda et al. | 359/699 |
| 5,043,752 | 8/1991 | Kohmoto | 354/195.12 |
| 5,144,494 | 9/1992 | Sekiguchi | 359/700 |
| 5,164,757 | 11/1992 | Nomura | 354/403 |
| 5,227,835 | 7/1993 | Anagnostopolulos | 354/412 |
| 5,359,385 | 10/1994 | Ishida et al. | 354/412 |

FOREIGN PATENT DOCUMENTS

| | | | |
|---|---|---|---|
| 0444685 | 4/1991 | European Pat. Off. | |
| 144410 | 6/1991 | Japan | 359/704 |
| 92/11563 | 7/1992 | WIPO | |

OTHER PUBLICATIONS

Patent Abstracts of Japan vol. 014 No. 092 (P–1009) published Feb. 20, 1990 and JP–A–01 300237 Published Dec. 4, 1989.
Patent Abstracts of Japan vol. 016 No. 433 (P–1418) published Sep. 10, 1992.
Patent Abstracts of Japan vol. 016 No. 532 (P–1448) published Oct. 30, 1992.
French Search Report and Annex.

*Primary Examiner*—Georgia Y. Epps
*Assistant Examiner*—Ricky Mack
*Attorney, Agent, or Firm*—Sandler, Greenblum & Bernstein

[57] ABSTRACT

A zoom lens assembly has a rotatable cam ring having first helicoid threads and a cam groove, a front lens group held by a front lens group frame having second helicoid threads held in mesh with the first helicoid threads for moving the front lens group along an axis of the rotatable cam ring, and a rear lens group held by a rear lens group frame having a cam follower engaging in the cam groove for moving the rear lens group along the axis relatively to the front lens group. A pair of diametrically opposite tension springs in the form of coil springs is coupled between the front and rear lens group frames for normally urging them toward each other thereby to remove backlash between the first and second helicoid threads and between the cam follower and the cam groove.

29 Claims, 5 Drawing Sheets

BACKLASH REMOVING MECHANISM FOR ZOOM LENS ASSEMBLY

This application is a continuation of application Ser. No. 08/046,721, filed Apr. 16, 1993, now abandoned.

BACKGROUND OF THE INVENTION

The present invention relates to a zoom lens assembly, and more particularly to a mechanism for taking up backlash or lost motion along an optical axis between magnification-varying lens groups that are axially movably supported in a cam ring of a zoom lens barrel.

Some zoom lens assemblies comprise at least front and rear magnification-varying lens groups axially movably supported in a zoom lens barrel. The rear lens group has a cam follower slidably placed in a cam groove defined in a cam ring that is rotatable about its own axis in the zoom lens barrel. When the cam ring is rotated, the rear lens group is moved along the optical axis of the zoom lens barrel under the control of the cam follower that slides in the cam groove in the cam ring. The front lens group has either a cam follower guided by another cam groove defined in the cam ring or has a helicoid gear meshing with a helicoid gear on the cam ring.

The front and rear lens groups are subject to axial backlash or lost motion with respect to the cam ring because there is always an axial clearance between the cam followers and the cam grooves and also between the helicoid gears no matter how accurate the cam followers, the cam grooves, and the helicoid gears are machined and assembled.

The axial backlash or lost motion in zoom lenses is undesirable as it tends to adversely affect zooming movement of the zoom lens assemblies. For example, because of the axial backlash, an intermediate zoom setting reached when the zoom lens assembly zooms out from the tele end of the zooming range differs from an intermediate zoom setting reached when the zoom lens assembly zooms in from the wide end of the zooming range.

SUMMARY OF THE INVENTION

It is therefore an object of the present invention to provide a mechanism for removing axial backlash or lost motion between magnification-varying lens groups that are axially movably supported in a cam ring of a zoom lens barrel.

It is another object of the present invention to provide a zoom lens assembly having means for enabling front and rear lens groups to move accurately relative to each other to achieve accurate zooming movement of the zoom lens assembly.

According to a first aspect of the present invention, there is provided a zoom lens assembly comprising a rotatable cam ring having an axis, a front lens assembly supported in the rotatable cam ring, for movement along the axis, a rear lens assembly supported in the rotatable cam ring, for movement along the axis relative to the front lens assembly, and tension spring means coupled between the front and rear lens assemblies for normally urging the front and rear lens assemblies toward each other.

According to a second aspect of the present invention, there is also provided a zoom lens assembly comprising a rotatable cam ring having an axis, a front lens assembly supported in the rotatable cam ring and held in helicoid threaded engagement with the cam ring, for movement along the axis, a rear lens assembly supported in the rotatable cam ring and held in cam engagement with the cam ring, for movement along the axis relatively to the front lens assembly, and tension spring means coupled between the front and rear lens assemblies for removing backlash between the front and rear lens assemblies.

According to a third aspect of the present invention, there is further provided a zoom lens assembly comprising a rotatable cam ring having first helicoid threads and a cam groove, a front lens group, a front lens group frame holding the front lens group and having second helicoid threads held in mesh with the first helicoid threads for moving the front lens group along an axis of the rotatable cam ring, a rear lens group, a rear lens group frame holding the rear lens group and having a cam follower engaging in the cam groove for moving the rear lens group along the axis relative to the front lens group, and tension spring means coupled between the front and rear lens group frames for removing backlash between the first and second helicoid threads and between the cam follower and the cam groove.

According to a fourth aspect of the present invention, there is also provided a zoom lens assembly, comprising front and rear magnification-varying lens groups movable toward and away from each other, front and rear lens group frames holding the front and rear magnification-varying lens groups, respectively; a rotatable cam ring having a cam groove, at least said rear lens group frame having a cam follower engaging in said cam groove; and backlash removing means including tension spring means coupled between said front and rear lens group frames for normally urging the front and rear lens group frames toward each other.

According to a fifth aspect of the present invention, there is also provided a zoom lens assembly having an optical axis, comprising at least two lens assemblies which are arranged such that a distance therebetween along said optical axis is changeable in order to vary the magnification of said zoom lens: a rotatable cam ring for changing said distance upon rotation of at least one lens assembly; and tension spring means coupled between said lens assemblies for normally urging the lens assemblies toward each other.

According to a sixth aspect of the present invention, there is also provided a zoom lens assembly having an optical axis, comprising at least two lens assemblies which are supported so as to allow change of the positional relationship of said at least two lens assemblies along said optical axis in order to vary the magnification of said zoom lens: a rotatable cam ring for changing said distance upon rotation of at least one lens assembly; and tension spring means coupled between said lens assemblies for normally urging the lens assemblies toward each other.

DESCRIPTION OF THE ACCOMPANYING DRAWINGS

Figure 4:
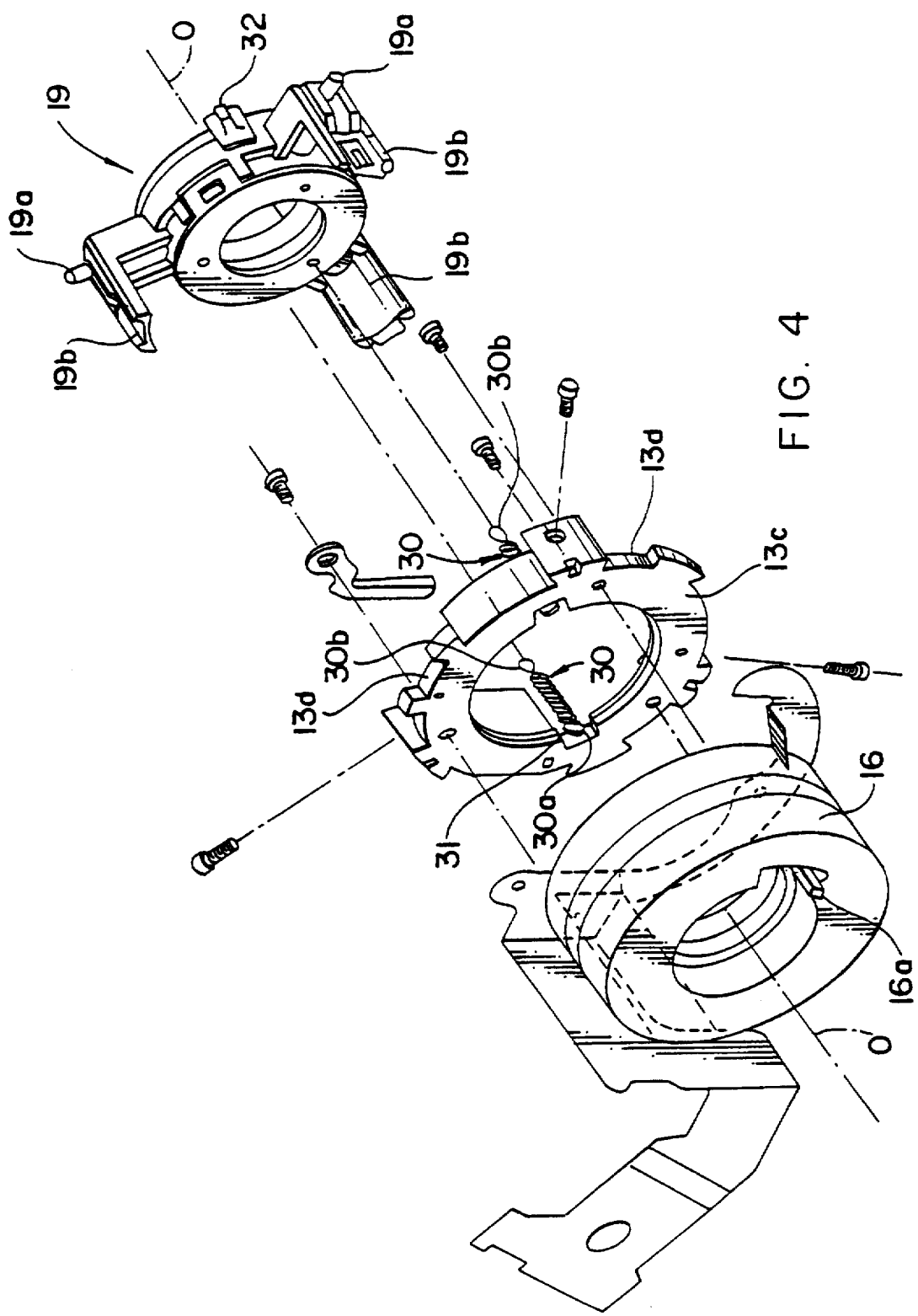
Figure 5:
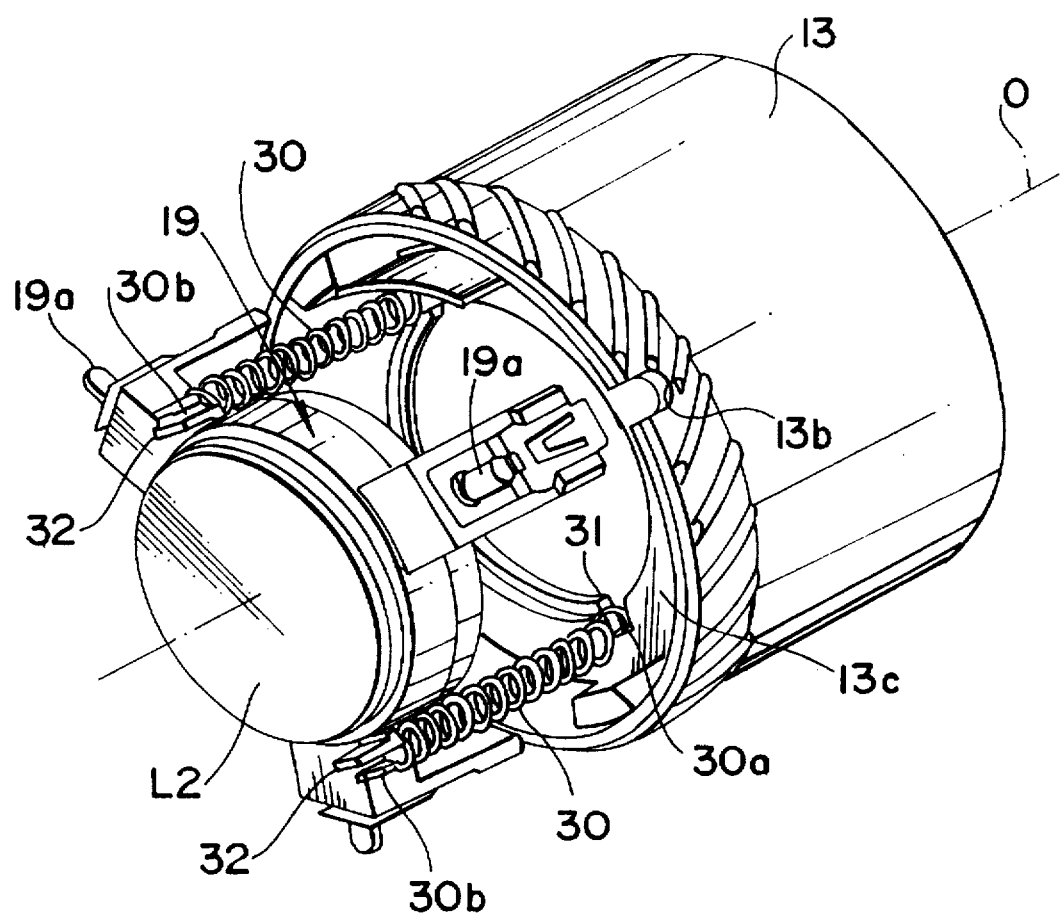

FIG. 4 is an exploded perspective view of the rear lens group, the backlash removing mechanism, an annular shutter unit, and an annular shutter holder frame of the zoom lens assembly; and FIG. 5 is a perspective view of a front lens group, the rear lens group, the backlash removing mechanism, and the annular shutter holder frame, the rear lens group being shown as being detached from the front lens group with the backlash removing mechanism connected therebetween.

DESCRIPTION OF THE EMBODIMENT

A zoom lens assembly incorporating a backlash removing mechanism which embodies the principles of the present invention will be described below with reference to FIGS. 1 and 2.

The terms "front" and "rear" referred to herein, are used with respect to the direction in which the zoom lens assembly faces a subject to be photographed. For example, the front end of a component of the zoom lens assembly is positioned closer to the subject, whereas the rear end of the component is positioned more remote from the subject as compared to the front end.

Figure 1:
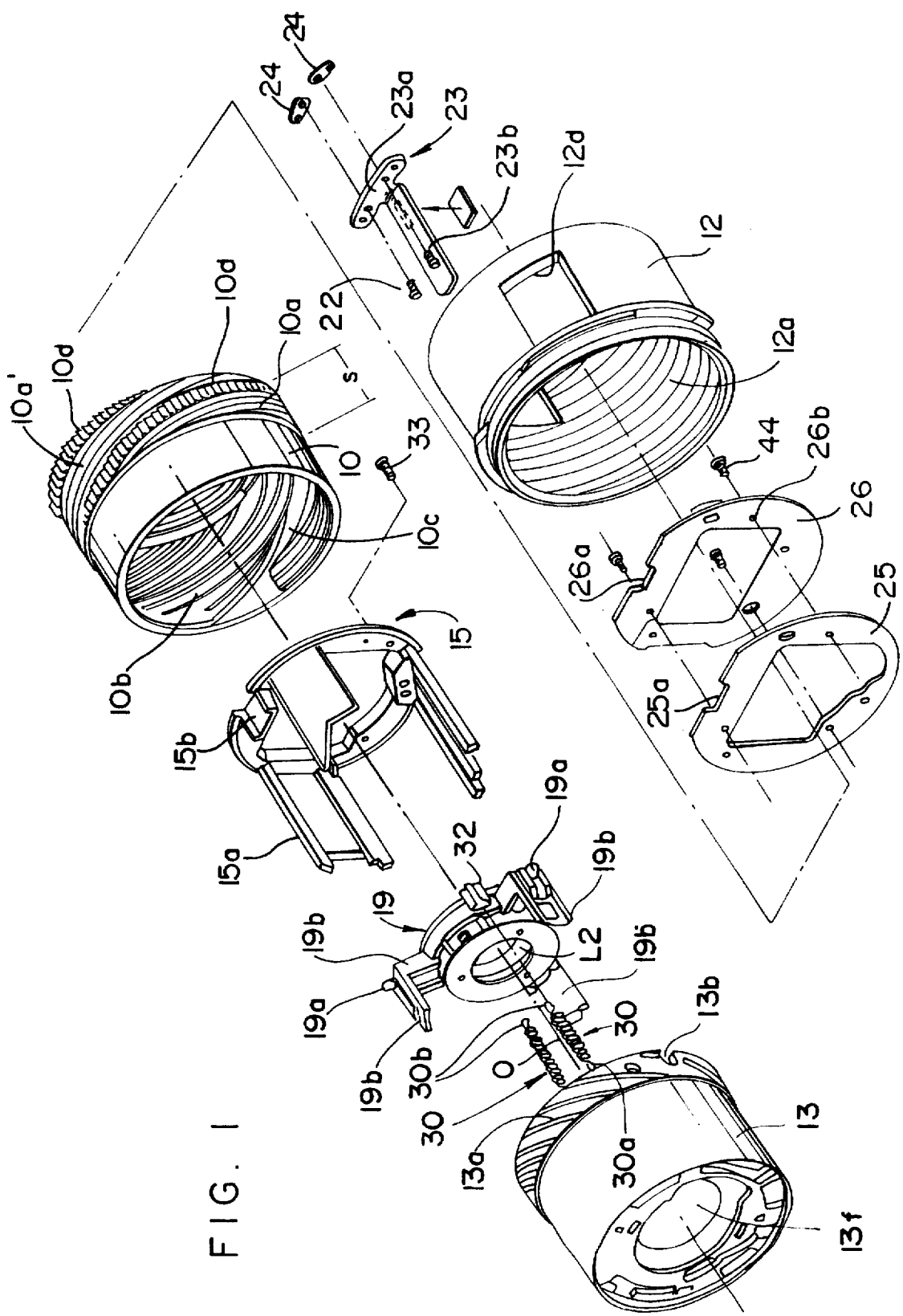
FIG. 1 is an exploded perspective view of a zoom lens assembly which incorporates a backlash removing mechanism according to the present invention.
Figure 2:
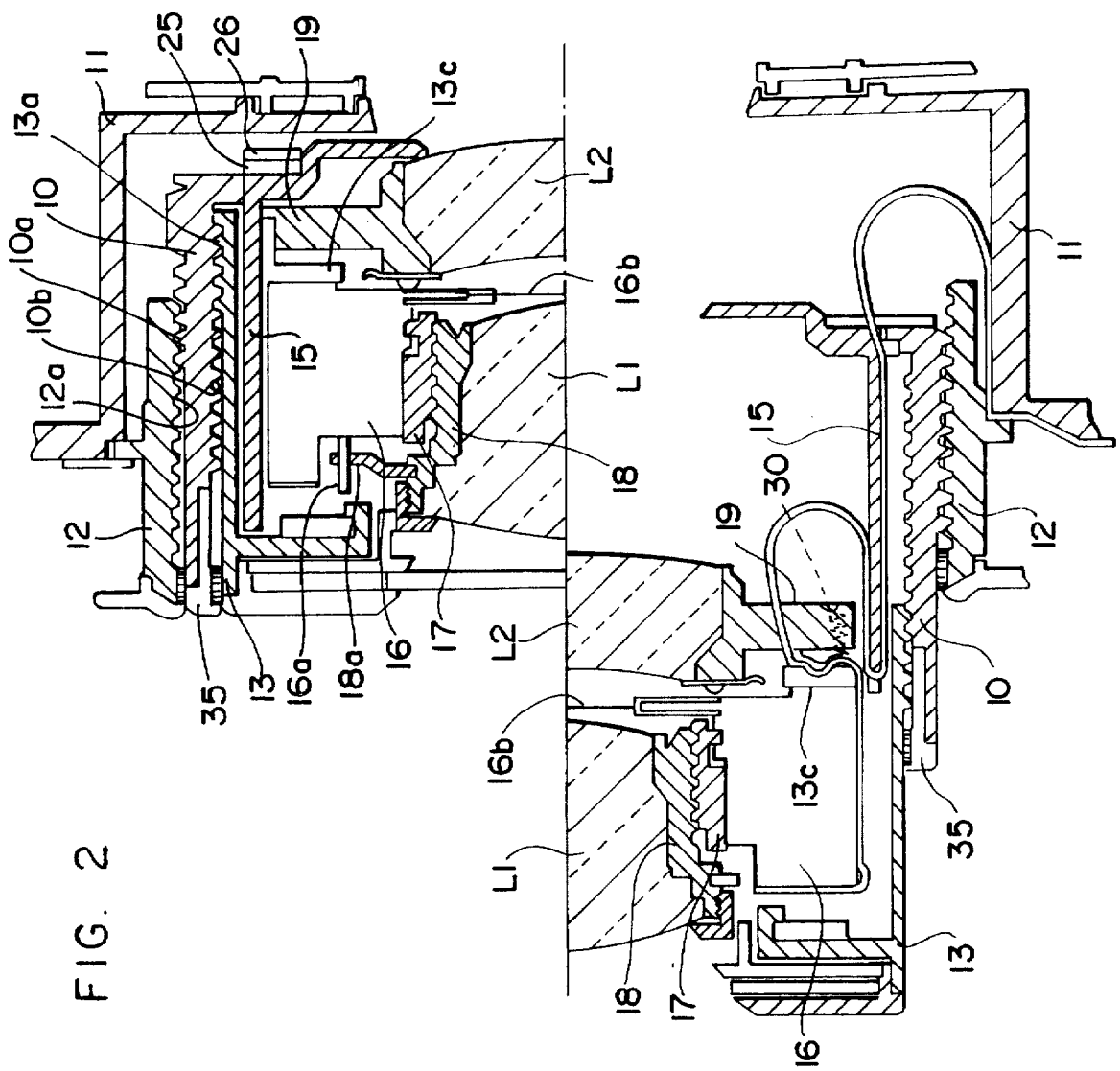
FIG. 2 is an axial cross-sectional view of the zoom lens assembly, with an upper half thereof shown in a retracted (wide-end) position and a lower half thereof shown in a projected (tele-end) position.

As shown in FIG. 2, the zoom lens assembly is movably supported by a stationary lens holder 11 fixed to the camera casing of a camera (not shown). As shown in FIGS. 1 and 2, the zoom lens assembly has a zoom lens barrel including a cam ring 10 having a plurality of parallel male helicoid threads or ribs 10a on its outer circumferential surface near a rear end thereof, and a helicoid ring 12 having a plurality of parallel female helicoid threads or ribs 12a, on its inner circumferential surface, which are held in mesh with the male helicoid threads 10a of the cam ring 10. As shown in FIG. 2, the helicoid ring 12 has its rear portion inserted in the lens holder 11 and is secured to the lens holder 11. The cam ring 10 is therefore rotatable and axially movable with respect to the helicoid ring 12.

As shown in FIGS. 1 and 2, the cam ring 10 has a plurality of parallel female helicoid threads or ribs 10b on its inner circumferential surface, and a plurality of (three in the illustrated embodiment) cam grooves 10c defined at circumferentially equally spaced intervals in the inner circumferential surface and extending generally along but slightly obliquely to the female helicoid threads 10b. The zoom lens barrel also includes a front lens group barrel 13 having a plurality of parallel male helicoid threads or ribs 13a on its outer circumferential surface near a rear end thereof, the male helicoid threads 13a being held in mesh with the female helicoid threads 10b. Thus, the front lens group barrel 13 is rotatable and axially movable with respect to the cam ring 10.

Two circular light shield plates 25, 26 with central openings are positioned at the rear end of the cam ring 10. The light shield plates 25, 26 have respective positioning recesses 25a, 26a defined in upper edges thereof. The cam ring 10 houses therein a linear motion guide ring 15 for guiding the front lens barrel 13 to move linearly along the optical axis O of the zoom lens assembly. The linear motion guide ring 15, which is fastened to the front lens group barrel 13 by screws 33, has a plurality of axial guide arms 15a extending axially in the cam ring 10 and spaced slightly radially inwardly from the female helicoid threads 10b of the cam ring 10. The cam ring 10 is rotatable with respect to the linear motion guide ring 15. The linear motion guide ring 15 has a positioning recess 15b defined in an upper edge thereof. The light shield plates 25, 26 are fastened to the rear end of the linear motion guide ring 15 by a plurality of screws 44 extending through holes 25b, 26b defined in the light shield plates 25, 26, with the positioning recesses 25a, 26a, 15b being held in axial registry with each other.

The linear motion guide ring 15 is held non-rotatable in the cam ring 10 by a guide ring holder 23 secured to the camera casing. More specifically, the guide ring holder 23 has a transverse attachment plate 23a on its rear end which is fastened by screws 22 to a pair of mount bases 24 fixed to the camera casing, and an axial guide arm 23b extending forwardly from the attachment plate 23a, axially through the positioning recesses 25a,26a, 15b. Accordingly, the light shield plates 25, 26 and the linear motion guide ring 15 are non-rotatably secured with respect to the camera casing and hence the helicoid ring 12.

The front lens group barrel 13 has a tubular wall that is axially movably positioned in a radial space defined between the cam ring 10 and the guide arms 15a of the linear motion guide ring 15. The front lens group barrel 13 is guided by the guide arms 15a for linear axial movement with respect to the cam ring 10 upon rotation of the cam ring 10. To the rear end of the front lens group barrel 13, there is fixed an annular shutter holder frame 13c (see FIGS. 2 and 4) that is secured to the rear end of an annular shutter unit 16 fixedly disposed in the front lens group barrel 13. A helicoid ring 17 fixedly mounted in the annular shutter unit 16 has an internal helicoid gear held in mesh with an external helicoid gear of an annular front lens group frame 18 which holds a front lens group L1 (see FIG. 2). The front lens group barrel 13 has a lens aperture 13f (see FIG. 1) for the front lens group L1. An annular light shield 35 is mounted in the front end of the cam ring 10 and held in sliding contact with an outer circumferential wall surface of the front lens group barrel 13.

The shutter unit 16 has a drive pin 16a projecting forwardly from its front surface, and engaging a driven pin 18a that extends radially outwardly from the front lens group frame 18. The shutter unit 16 also has a shutter blade 16b positioned immediately behind the front lens group L1. When the camera is in use and ready to take a picture of a subject through the zoom lens assembly, the drive pin 16a is rotated around the optical axis O of the zoom lens assembly through an angle indicated by a distance signal from a rangefinder (not shown), which represents the distance from the camera to the subject, causing the driven pin 18a to rotate the front lens group frame 18. As the front lens group frame 18 rotates, the front lens group frame 18 and hence the front lens group L1 move in the optical axis direction with respect to the front lens group barrel 13, thereby controlling the zoom lens assembly to focus on the subject. In response to a brightness signal representing the brightness of the subject, the shutter unit 18 opens and closes the shutter blade 16b, exposing a photographic film (not shown) in the camera casing to light reflected from the subject.

Figure 3:
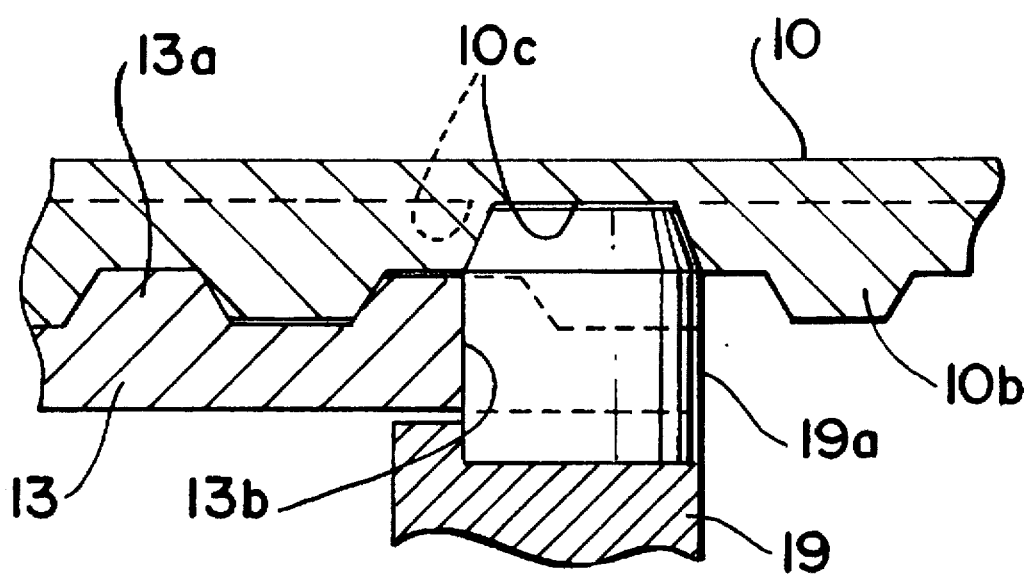
FIG. 3 is an enlarged fragmentary cross-sectional view showing a cam follower pin of a rear lens group which slidably engages in a cam groove defined in a cam ring of the zoom lens assembly.

The zoom lens assembly further includes an annular rear lens group frame 19 rotatably positioned in the cam ring 10, the rear lens group frame 19 holding a rear lens group L2. As shown in FIGS. 1, 4, and 5, the rear lens group frame 19 has a plurality of (three in the illustrated embodiment) circumferentially equally spaced cam follower pins 19a projecting radially outwardly from respective radial bases which include respective axially extending guide arms 19b. The cam follower pins 19a are axially received in respective axially opening slots 13b (see FIG. 5) defined in the rear end of the front lens group barrel 13 partly across the male helicoid threads 13a thereon. As shown in FIG. 3, the cam follower pins 19a are slidably disposed in the respective cam grooves 10c of the cam ring 10. The guide arms 19b are axially inserted through respective guide recesses 13d (see FIG. 4) defined at circumferentially spaced intervals in an outer circumferential edge of the shutter holder frame 13c, and also axially extend into the front lens group barrel 13. Inasmuch as the front lens group barrel 13 is guided for linear axial movement by the linear motion guide ring 15, and the rear lens group frame 19 is guided for linear axial movement by the front lens group barrel 13, both the front lens group barrel 13 and the rear lens group frame 19 are linearly movable along the optical axis O of the zoom lens assembly, and non-rotatable with respect to the helicoid ring 12, and hence the camera casing.

As shown in FIG. 1, the cam ring 10 also has, on its outer circumferential surface near the rear end, a plurality of parallel gear tooth rows 10d, each comprising spur gear teeth extending parallel to the axis of the cam ring 10. In the embodiment, the cam ring 10 has three gear tooth rows 10d, one of which is not illustrated in FIG. 1. The gear tooth rows 10d are inclined to the axis of the cam ring 10 in a direction parallel to the male helicoid threads 10a. Adjacent two of the gear tooth rows 10d are circumferentially spaced apart from each other by such a distance that one male helicoid thread 10a' is present between the adjacent two gear tooth rows 10d. More specifically, the outer circumferential threaded surface of the cam ring 10 near its rear end has three circumferentially spaced thread-free regions parallel to the male helicoid threads 10a and alternating with male helicoid threads 10a', and the gear tooth rows 10d are positioned in the respective thread-free regions. The male helicoid threads 10a, 10a and the gear tooth rows 10d have the same axial length s.

The helicoid ring 12 has clearance grooves (not shown) defined in its inner circumferential surface for accommodating the gear tooth rows 10d respectively therein out of contact with the helicoid ring 12. When the cam ring 10 rotates and axially moves with the male helicoid threads 10a, 10a' in mesh with the female helicoid threads 12a, the gear tooth rows 10d move in the respective clearance grooves while being kept out of contact with the helicoid ring 12.

The helicoid ring 12 has a rectangular opening 12d defined in its circumferential wall. A pinion (not shown) coupled to a drive motor (not shown) is disposed at a fixed position in the opening 12d and held in mesh with the gear tooth rows 10d. The pinion has an axial length large enough to mesh with all the gear tooth rows 10d simultaneously. However, when the cam ring 10 is positioned in the front end (tele end as shown in the lower half of FIG. 2) or rear end (wide end as shown in the upper half of FIG. 2) of a stroke of its axial movement, the pinion only meshes with the rearmost or frontmost gear tooth row 10d, respectively.

When the cam ring 10 is rotated by the drive motor through the pinion and the gear tooth rows 10d meshing therewith, the cam ring 10 moves along the optical axis O because of the meshing engagement between the male helicoid threads 10a and the female helicoid threads 12a. At the same time, the front lens group barrel 13 and hence the front lens group L1 move linearly along the optical axis O since the female helicoid threads 10b mesh with the male helicoid threads 13a and the linear motion guide ring 15 engages the shutter holder frame 13c. The rotation of the cam ring 10 enables the rear lens group frame 19 and hence the rear lens group L2 to move linearly along the optical axis O for zooming the zoom lens assembly, because the cam follower pins 19a slidably ride in the respective cam grooves 10c, and the rear lens group frame 19 is linearly movably guided by the front lens group barrel 13, which is in turn guided by the linear motion guide ring 15. Since the cam grooves 10c are inclined to the female helicoid threads 10b, the rear lens group frame 19 axially moves toward and away from the front lens group barrel 13 as they axially move upon the rotation of the cam ring 10.

According to the present invention, as shown in FIGS. 1, 4, and 5, a pair of diametrically opposite tension springs 30 in the form of coil springs is coupled between the front lens group barrel 13 and the rear lens group frame 19 for normally urging them resiliently toward each other along the optical axis O. More specifically, the shutter holder frame 13c has a pair of diametrically opposite spring retainer fingers 31 (see FIGS. 4 and 5) projecting radially inwardly from its inner circumferential edge, and the rear lens group frame 19 has a corresponding pair of diametrically opposite spring retainer hooks 31 projecting radially outwardly from its outer circumferential edge and extending away from the front lens group barrel 13. The tension springs 30 have respective looped ends 30a engaging the spring retainer fingers 31, respectively, and respective looped ends 30b engaging the spring retainer hooks 32, respectively.

The tension springs 30 are kept under tension at all times even when the rear lens group frame 19 and the front lens group barrel 13 are positioned closest to each other. Therefore, the front lens group L1 is always biased to move rearwardly toward the rear lens group L2, and the rear lens group L2 is always biased to move forwardly toward the front lens group L1. Specifically, the cam follower pins 19a are resiliently held in abutment against front walls of the respective cam grooves 10c under the bias of the tension springs 30, and the male helicoid threads 13a of the front lens group barrel 13 have rear wall surfaces resiliently held in abutment against front wall surfaces of the female helicoid threads 10b of the cam ring 10 under the bias of the tension springs 30, thereby taking up undesirable backlash which would otherwise be present between the cam follower pins 19a and the front walls of the respective cam grooves 10c and also between the male helicoid threads 13a and the female helicoid threads 10b. Therefore, the front and rear lens groups L1, L2 are accurately positioned, relative to each other, to enable the zoom lens assembly to effect precise and stable zooming movement irrespective of whether the zoom lens assembly zooms in or out. The zoom lens assembly is able to reach a constant intermediate zoom setting when it zooms out from the tele end of the zooming range as well as when it zooms in from the wide end of the zooming range.

Use of the tension springs 30 is advantageous for the following reasons: since the tension springs 30 urge the rear lens group frame 19 and the front lens group barrel 13 toward each other, the rear lens group frame 19 and the front lens group barrel 13 may be placed in a relatively small space, i.e., the arrangement does not require an extra space which would be necessary if they were urged by compression springs; the tension springs 30 are free of the danger of buckling even if they have strong spring forces; and the tension springs 30 do not need to be guided by guide pins, and can easily be assembled in position. Furthermore, when the front lens group barrel 13 moves forwardly to the front end of its stroke, it abuts against and is resisted by the annular light shield 35. At this time, the annular light shield 35 applies resistive forces to the front lens group barrel 13 in the same direction as the direction in which the front lens group barrel 13 is biased by the tension springs 30. Consequently, the front lens group barrel 13 is not axially shifted upon contact with the annular light shield 35 because it has already been axially biased by the tension springs 30 so as to be free of any axial backlash. As a result, the front lens group barrel 13 is stopped accurately in the front end of its stroke with respect to the cam ring 10.

Furthermore, according to the present invention, the advantages of the provision of the tension springs 30 so as to be free of any axial backlash would also be obtained in the case wherein the front lens group barrel 13 is always forced to be moved forward (that is, toward the tele side from the wide side) by a predetermined small distance in order to remove the backlash of the zoom lens when the zooming operation in a direction of which the front lens group barrel 13 is retracted to a camera body, i.e., movement from the tele side to the wide side has been completed.

The present disclosure relates to a subject matter contained in Japanese Utility Model Application No. HEI 4-24854, filed on Apr. 17, 1992, which is expressly incorporated herein by reference in its entirety.

What is claimed is:

1. A zoom lens assembly comprising:

a rotatable cam ring having an axis;

a front lens assembly supported in said rotatable cam ring, for movement along said axis;

a rear lens assembly supported in said rotatable cam ring, for movement along said axis relative to said front lens assembly; and tension spring means coupled between said front and rear lens assemblies for normally urging the front and rear lens assemblies toward each other;

wherein said tension spring means comprises a pair of diametrically opposite coil springs extending axially between said front and rear lens assemblies;

wherein each of said pair of diametrically opposite coil springs further comprises a central axis about which coils of said coil spring are oriented, and each said central axis is radially spaced from an optical axis of the zoom lens assembly; and wherein said pair of diametrically opposite coil springs are kept under tension at all times and at all positions of said front and rear lens assemblies.

2. The zoom lens assembly according to claim 1, wherein said tension spring means comprises at least one coil spring extending axially between said front and rear lens assemblies.

3. The zoom lens assembly according to claim 1, wherein said tension spring means comprises at least two tension springs coupled between said front and rear lens assemblies.

4. The zoom lens assembly according to claim 1, wherein each of said at least one coil spring comprises a pair of looped ends for coupling each said at least one coil spring with said front and rear lens assemblies; and said front and rear lens assemblies each comprising at least one hooking means for hooking a respective one of said looped ends.

5. A zoom lens assembly comprising:

a rotatable cam ring having an axis;

a front lens assembly supported in said rotatable cam ring and held in helicoid threaded engagement with said cam ring, for movement along said axis;

a rear lens assembly supported in said rotatable cam ring and held in cam engagement with said cam ring, for movement along said axis relative to said front lens assembly; and tension spring means coupled between said front and rear lens assemblies for removing backlash between said front and rear lens assemblies;

wherein said tension spring means comprises at least one coil spring extending axially between said front and rear lens assemblies;

wherein said at least one coil spring further comprises a central axis about which coils of said at least one coil spring are oriented, said central axis being radially spaced from an optical axis of the zoom lens assembly; and wherein said at least one coil spring is kept under tension at all times and at all positions of said front and rear lens assemblies.

6. The zoom lens assembly according to claim 5, wherein said tension spring means comprises a pair of diametrically opposite coil springs extending axially between said front and rear lens assemblies.

7. The zoom lens assembly according to claim 5, wherein said tension spring means comprises at least two tension springs coupled between said front and rear lens assemblies.

8. The zoom lens assembly according to claim 5, wherein each of said at least one coil spring comprises a pair of looped ends for coupling each said at least one coil spring with said front and rear lens assemblies; and said front and rear lens assemblies each comprising at least one hooking means for hooking a respective one of said looped ends.

9. A zoom lens assembly comprising:

a rotatable cam ring having first helicoid threads and a cam groove;

a front lens group;

a front lens group barrel holding said front lens group and having second helicoid threads held in mesh with said first helicoid threads for moving said front lens group along an axis of said rotatable cam ring;

a rear lens group;

a rear lens group frame holding said rear lens group and having a cam follower engaging in said cam groove for moving said rear lens group along said axis relative to said front lens group; and tension spring means coupled between said front and rear lens group frames for removing backlash between said first and second helicoid threads and between said cam follower and said cam groove;

wherein said tension spring means comprises at least one coil spring extending axially between said front lens group barrel and said rear lens group frame;

wherein said at least one coil spring further comprises a central axis about which coils of said at least one coil spring are oriented, said central axis being distanced from an optical axis of the zoom lens assembly; and wherein said at least one coil spring is kept under tension at all times and at all positions of said front and rear lens group frames.

10. The zoom lens assembly according to claim 9, wherein said tension spring means comprises a pair of diametrically opposite coil springs extending axially between said front and rear lens group frames.

11. The zoom lens assembly according to claim 9, wherein said tension spring means comprises at least two tension springs coupled between said front and rear lens group frames.

12. The zoom lens assembly according to claim 9, wherein each of said at least one coil spring comprises a pair of looped ends for coupling each said at least one coil spring with said front lens group barrel and said rear lens group frame; and said front lens group barrel and said rear lens group frame each comprising at least one hooking means for hooking a respective one of said looped ends.

13. A zoom lens assembly comprising:

front and rear magnification-varying lens groups movable toward and away from each other, front and rear lens group frames holding said front and rear magnification-varying lens groups, respectively;

a rotatable cam ring having a cam groove, at least said rear lens group frame having a cam follower engaging in said cam groove; and backlash removing means including tension spring means coupled between said front and rear lens group frames for normally urging said front and rear lens groups toward each other;

wherein said tension spring means comprises at least one coil spring extending axially between said front and rear lens group frames;

wherein said at least one coil spring further comprises a central axis about which coils of said at least one coil spring are oriented, said central axis being distanced from an optical axis of the zoom lens assembly; and wherein said at least one coil spring is kept under tension at all times and at all positions of said front and rear lens group frames.

14. The zoom lens assembly according to claim 13, wherein said tension spring means comprises a pair of diametrically opposite coil springs extending axially between said front and rear lens group frames.

15. The zoom lens assembly according to claim 13, further comprising a front lens group barrel within which said front lens group frame is located, wherein said cam ring has first helicoid threads and said front lens group barrel has second helicoid threads meshing with said first helicoid threads.

16. The zoom lens assembly according to claim 13, wherein said tension spring means comprises at least two tension springs coupled between said front and rear lens group frames.

17. The zoom lens assembly according to claim 23, wherein each of said at least one coil spring comprises a pair of looped ends for coupling each said at least one coil spring with said front and rear lens group frames; and said front and rear lens group frames each comprising at least one hooking means for hooking a respective one of said looped ends.

18. A zoom lens having an optical axis, comprising:

at least two lens assemblies which are arranged such that a distance therebetween alone the optical axis is changeable in order to vary the magnification of said zoom lens; a rotatable cam ring for changing said distance upon rotation of at least one lens assembly; and tension spring means coupled between said lens assemblies for normally urging said lens assemblies toward each other;

wherein said tension spring means comprises at least one coil spring extending axially between said at least two assemblies;

wherein said at least one coil spring further comprises a central axis about which coils of said at least one coil spring are oriented, said central axis being distanced from the optical axis of the zoom lens; and wherein said at least one coil spring is kept under tension at all times and at all positions of said lens assemblies.

19. The zoom lens according to claim 18, wherein said at least two lens assemblies includes a front lens assembly and a rear lens assembly.

20. The zoom lens according to claim 19, wherein said rear lens assembly is moved relative to said front lens assembly along said optical axis when the distance between the front and rear lens assemblies is to be changed.

21. The zoom lens according to claim 19, wherein said cam ring comprises first helicoid threads and a cam groove, said front lens assembly comprises second helicoid threads held in mesh with said first helicoid threads for moving said front lens assembly along the optical axis, and said rear lens assembly comprises a cam follower engaging in said cam groove for moving said rear lens assembly along said optical axis relatively to said front lens assembly.

22. The zoom lens assembly according to claim 18, wherein said tension spring means comprises at least two tension springs coupled between said lens assemblies.

23. The zoom lens assembly according to claim 18, wherein each of said at least one coil spring comprises a pair of looped ends for coupling each said at least one coil spring with said at least two lens assemblies; and said at least two lens assemblies each comprising at least one hooking means for hooking a respective one of said looped ends.

24. A zoom lens having an optical axis, comprising:

at least two lens assemblies which are supported so as to allow change of the positional relationship of said at least two lens assemblies along the optical axis in order to vary the magnification of said zoom lens;

a rotatable cam ring for changing said distance upon rotation of at least one lens assembly; and tension spring means coupled between said lens assemblies for normally urging said lens assemblies toward each other;

wherein said tension spring means comprises at least one coil spring extending axially between said at least two assemblies;

wherein said at least one coil spring further comprises a central axis about which coils of said at least one coil spring are oriented, said central axis being radially spaced from the optical axis; and wherein said at least one coil spring is kept under tension at all times and at all positions of said lens assemblies.

25. The zoom lens according to claim 24, wherein said at least two lens assemblies includes a front lens assembly and a rear lens assembly.

26. The zoom lens according to claim 25, wherein said rear lens assembly is moved relative to said front lens assembly along said optical axis when the distance between the front and rear lens assemblies is to be changed.

27. The zoom lens according to claim 25, wherein said cam ring comprises first helicoid threads and a cam groove, said front lens assembly comprises second helicoid threads held in mesh with said first helicoid threads for moving said front lens assembly along the optical axis, and said rear lens assembly comprises a cam follower engaging in said cam groove for moving said rear lens assembly along said optical axis relative to said front lens assembly.

28. The zoom lens assembly according to claim 24, wherein said tension spring means comprises at least two tension springs coupled between said lens assemblies.

29. The zoom lens assembly according to claim 18, wherein each of said at least one coil spring comprises a pair of looped ends for coupling each said at least one coil spring with said at least two lens assemblies; and said at least two lens assemblies each comprising at least one hooking means for hooking a respective one of said looped ends.

* * * * *

UNITED STATES PATENT AND TRADEMARK OFFICE
CERTIFICATE OF CORRECTION

PATENT NO.  : 5,485,315
DATED       : January 16, 1996
INVENTOR(S) : H. NOMURA et al.

It is certified that error appears in the above-indentified patent and that said Letters Patent is hereby corrected as shown below:

At column 9, line 35 (claim 17, line 1), change "23," to ---13,---.

At column 9, line 44 (claim 18, line 3), change "alone" to ---along---.

At column 10, line 9 (claim 21, line 9), change "relatively" to ---relative---.

At column 10, line 59 (claim 29, line 1), change "18," to ---24,---.

Signed and Sealed this

First Day of April, 1997

Attest:

BRUCE LEHMAN

Attesting Officer

Commissioner of Patents and Trademarks